United States Patent
Liu et al.

(10) Patent No.: US 9,552,073 B2
(45) Date of Patent: Jan. 24, 2017

(54) ELECTRONIC DEVICE

(71) Applicant: PIXART IMAGING INC., Hsin-Chu County (TW)

(72) Inventors: Chia-Yi Liu, Hsin-Chu County (TW); Shih-Wei Kuo, Hsin-Chu County (TW); Chun-Wei Chen, Hsin-Chu County (TW); Nien-Tse Chen, Hsin-Chu County (TW)

(73) Assignee: Pixart Imaging Inc., Hsin-Chu County (TW)

(*) Notice: Subject to any disclaimer, the term of this patent is extended or adjusted under 35 U.S.C. 154(b) by 17 days.

(21) Appl. No.: 14/712,026

(22) Filed: May 14, 2015

(65) Prior Publication Data
US 2015/0241987 A1 Aug. 27, 2015

Related U.S. Application Data

(63) Continuation-in-part of application No. 14/097,442, filed on Dec. 5, 2013.

(51) Int. Cl.
| | | |
|---|---|---|
| G09G 5/00 | (2006.01) |
| G06F 3/01 | (2006.01) |
| G06K 9/00 | (2006.01) |
| H04N 5/225 | (2006.01) |
| H04N 5/04 | (2006.01) |
| H04N 5/232 | (2006.01) |
| G06F 3/033 | (2013.01) |

(52) U.S. Cl.
CPC ............ *G06F 3/017* (2013.01); *G06K 9/00355* (2013.01); *H04N 5/04* (2013.01); *H04N 5/2258* (2013.01); *H04N 5/23241* (2013.01)

(58) Field of Classification Search
CPC ......... G06F 3/017; H04N 5/04; H04N 5/2258; H04N 5/23241; G06K 9/0035; G06K 9/00355
USPC ...................................................... 345/156
See application file for complete search history.

(56) References Cited

U.S. PATENT DOCUMENTS

| | | | | |
|---|---|---|---|---|
| 4,463,294 A | * | 7/1984 | Gibson ................ | B60S 1/0822 318/443 |
| 2010/0134308 A1 | | 6/2010 | Barnardo et al. | |
| 2010/0299642 A1 | * | 11/2010 | Merrell ................ | G06F 3/0325 715/863 |
| 2011/0267264 A1 | | 11/2011 | McCarthy et al. | |
| 2011/0298708 A1 | | 12/2011 | Hsu | |
| 2012/0306770 A1 | * | 12/2012 | Moore ..................... | G06F 3/01 345/173 |
| 2013/0043928 A1 | | 2/2013 | Jung et al. | |
| 2013/0229508 A1 | | 9/2013 | Li et al. | |
| 2013/0328761 A1 | * | 12/2013 | Boulanger ............. | G06F 3/017 345/156 |
| 2014/0149754 A1 | * | 5/2014 | Silva .................... | G06F 1/3212 713/300 |

FOREIGN PATENT DOCUMENTS

TW M293184 U 7/2006

* cited by examiner

*Primary Examiner* — Kwin Xie
(74) *Attorney, Agent, or Firm* — Rosenberg, Klein & Lee

(57) ABSTRACT

There is provided an electronic device including a plurality of sensing devices and a host. The sensing devices are connected in parallel or series. A part of the sensing devices and the host may remain in a power saving mode or a standby mode in operation so as to reduce the power consumption.

9 Claims, 16 Drawing Sheets

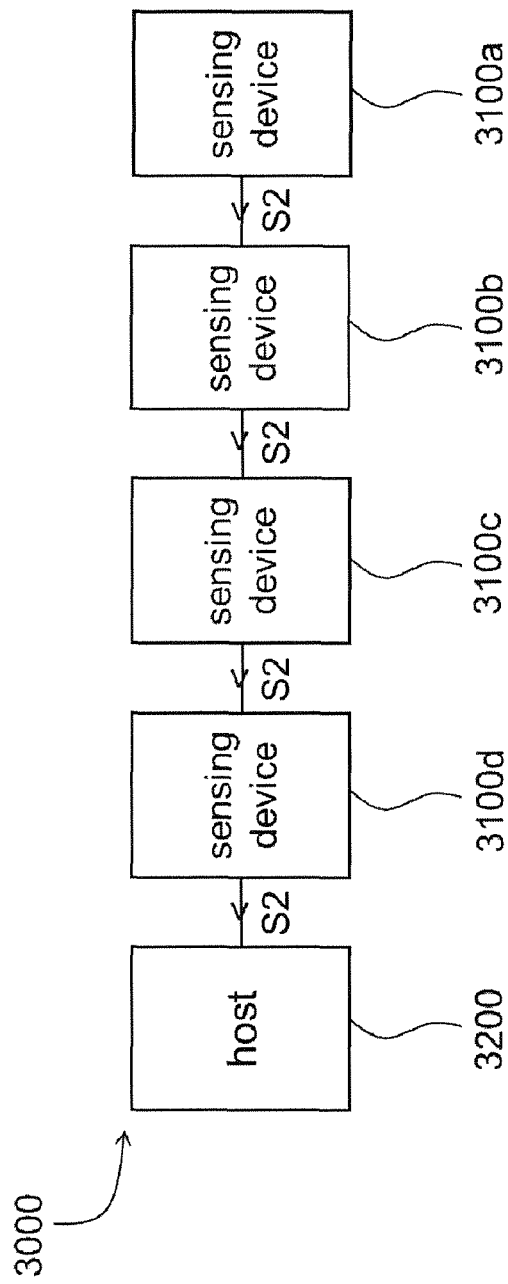
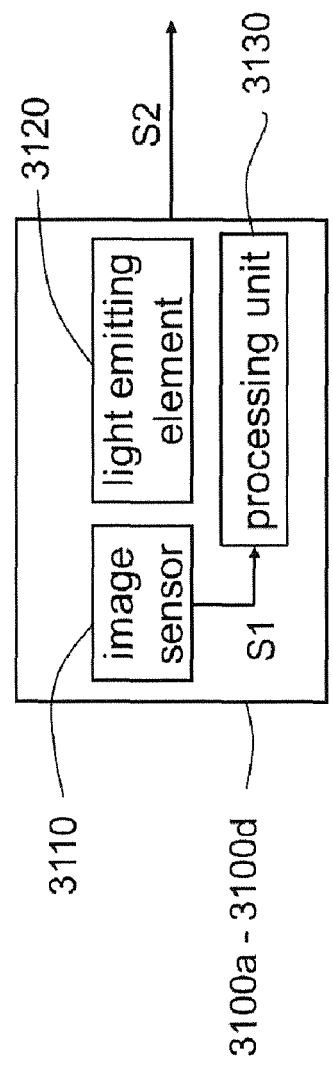
FIG. 17A
FIG. 17B

ELECTRONIC DEVICE

CROSS REFERENCE TO RELATED APPLICATION

The present application is a continuation-in-part application of U.S. Ser. No. 14/097,442, filed on Dec. 5, 2013, currently pending, the disclosure of which is hereby incorporated by reference herein in its entirety.

BACKGROUND

1. Field of the Disclosure

The present disclosure relates to an electronic device, and more particularly, to an electronic device having a plurality of sensing devices.

2. Description of the Related Art

Today, motion detection technology is widely applied to field of human-machine interface, where a new one is gesture sensing technique. The gesture sensing system can determine a user's requirement or instruction by sensing the user's hand motion or state, and then generates electrical signals to control the system.

Generally, a conventional gesture sensing system includes a light source and an image sensor. The light source generates light to the user's hand, and the image sensor captures/senses reflected light of the hand. However, because the lens of the image sensor has a limited view angle, the image sensor cannot capture the hand motion or state outside a specific range, causing the gesture sensing system having a limited sensing range.

SUMMARY

Accordingly, the present disclosure provides an electronic device including a plurality of sensing devices connected in parallel or series.

The present disclosure provides an electronic device. The electronic device includes a plurality of sensing devices and a host. The plurality of sensing devices is respectively configured to detect an object and output a detection signal containing object information of the object. The host is coupled to each of the plurality of sensing devices, and the host is configured to receive the detection signal of at least one of the plurality of sensing devices to determine an arrangement for the plurality of sensing devices to detect the object in a next sampling period.

The present disclosure further provides an electronic device. The electronic device includes a plurality of sensing devices and a host. The plurality of sensing devices is respectively configured to output a trigger signal when detecting a sensing event, wherein the plurality of sensing devices is connected in series and the sensing devices connected in series include an initial sensing device and a last sensing device. The host is coupled to the last sensing device but not coupled to other sensing devices, and the host is configured to receive the trigger signal of the last sensing device to generate a command signal.

The present disclosure further provides an electronic device. The electronic device includes a first sensing device, a second sensing device and a host. The first sensing device is configured to output a first signal when detecting a first event. The second sensing device is coupled to the first sensing device, and the second sensing device is configured to detect a second event when receiving the first signal and output a second signal when detecting the second event. The host is coupled to the second sensing device but not coupled to the first sensing device, and the host is configured to receive the second signal and verify a user identity according to the second signal.

These and other objectives of the present invention will no doubt become obvious to those of ordinary skill in the art after reading the following detailed description of the preferred embodiment that is illustrated in the various figures and drawings

BRIEF DESCRIPTION OF THE DRAWINGS

Other objects, advantages, and novel features of the present disclosure will become more apparent from the following detailed description when taken in conjunction with the accompanying drawings.

FIG. 17A is a schematic block diagram of an electronic device according to one embodiment of the present disclosure.

FIG. 17B is a schematic block diagram of a sensing device in the electronic device of FIG. 17A.

DETAILED DESCRIPTION OF THE EMBODIMENT

Figure 1:
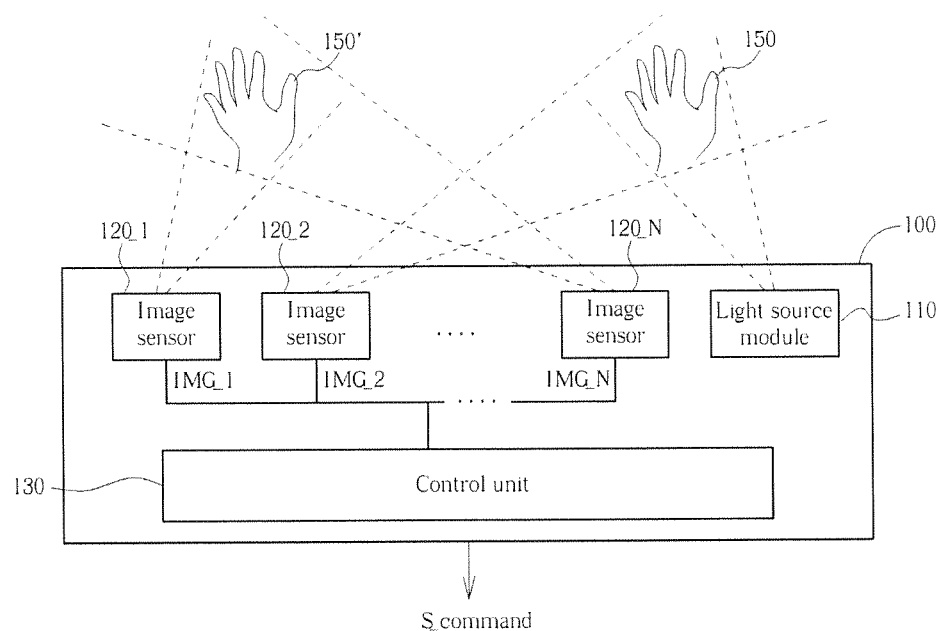
FIG. 1 is a diagram illustrating a motion detecting system according to a first embodiment of the present invention.

FIG. 1 is a diagram illustrating a motion detecting system according to an embodiment of the present invention. As shown in FIG. 1, the motion detecting system 100 includes a light source module 110, a plurality of image sensors 120_1-120_N and a control unit 130. The light source module 110 is used to generate light to an object 150. In this embodiment, the object 150 can be a user's hand, but it's not a limitation of the present invention. In other embodiments, the object 150 can be any other object that can represent different motions and states. The image sensors 120_1-120_N sense the object 150 under the light (i.e. the reflecting light of the object 150) to generate a plurality of different image sensing results IMG_1-IMG_N. The control unit 130 is couple to the image sensors 120_1-120_N, and is used to generate a control command S_command according to the image sensing results IMG_1-IMG_N. Finally, the motion detecting system 100 transmits the control command S_command to a host.

In one embodiment, some control commands may be determined by sensing the motions or states of more than one object (i.e. user's left hand and right hand). In this condition, the motion detecting system 100 needs to perform motion detection upon the objects. At this time, the light source module 110 illuminates the object 150 and the object 150', and the image sensors 120_1 and 120_2 sense the object 150 and the object 150', respectively, to generate two different image sensing results IMG_1 and IMG_2. Then, the control unit 130 generates the control command S_command according to the image sensing results IMG_1 and IMG_2.

Figure 2:
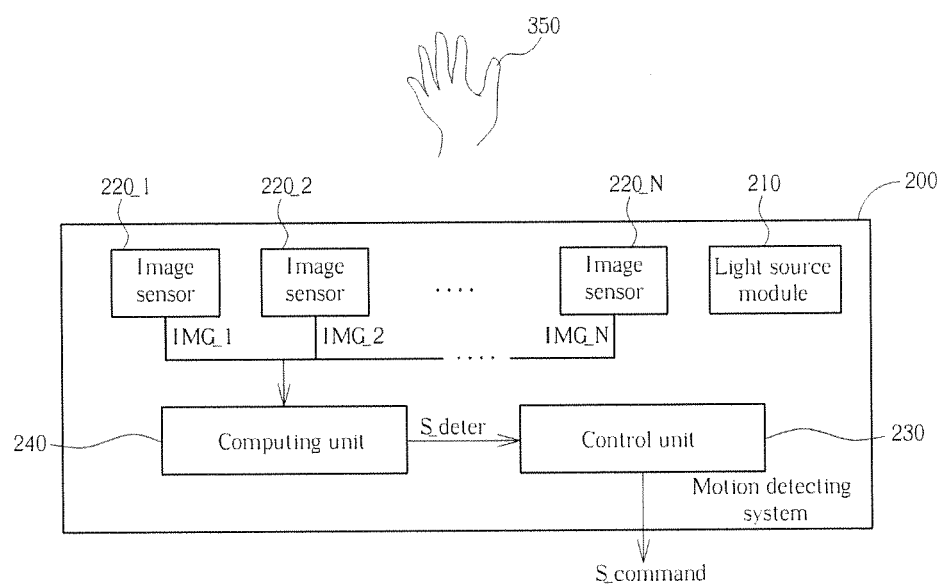
FIG. 2 is a diagram illustrating a motion detecting system according to a second embodiment of the present invention.

In addition, before the control unit generates the control command S_command according to the image sensing results IMG_1-IMG_N, the motion detecting system can use its computing unit to analyze the image sensing results IMG_1-IMG_N. Please refer to FIG. 2, which is a diagram illustrating a motion detecting system according to another embodiment of the present invention. As shown in FIG. 2, the motion detecting system 200 comprises not only a light source module 210, a plurality of image sensors 220_1-220_N and a control unit 230 but also a computing unit 240. The computing unit 240 is coupled between the image sensors 220_1-220_N and the control unit 230, and the computing unit 240 is used to generate a determining result S_deter according to the image sensing results IMG_1-IMG_N, where the determining result S_deter indicates the motion and state of the object 250. Then the computing unit 240 transmits the determining result S_deter to the control unit 230, and the control unit 230 generates the control command S_command according to the determining result S_deter. In addition, operations of the computing unit 240 may include analyzing image contents of the image sensing results IMG_1-IMG_N, and determines a shape and/or a center of the object 250, and/or determines a relative distance, angle and moving direction between the object 250 and the image sensors. For example, when the object 250 is a use's hand, the computing unit 240 can determine what gesture the hand shows. Then the control unit 230 compares the determining result S_deter with predetermined gesture (s), and the control unit 230 generates the control command S_command when the gesture the hand shows now is the same as a predetermined gesture.

Figure 3:
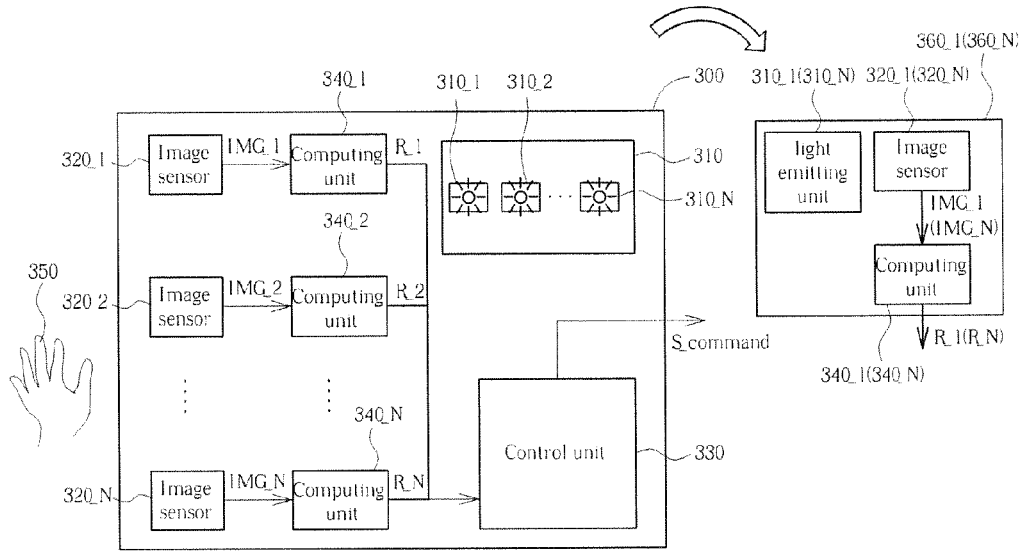
FIG. 3 is a diagram illustrating a motion detecting system according to a third embodiment of the present invention.

In another embodiment, the motion detecting system may include a plurality of computing units, and the computing units analyze image contents of the image sensing results, respectively. Please refer to FIG. 3, the motion detecting system 300 comprises a plurality of computing units 340_1-340_N, where the computing units 340_1-340_N are coupled to the image sensors 320_1-320_N, and the computing units 340_1-340_N respectively receive the image sensing results IMG_1-IMG_N generated from the image sensors 320_1-320_N. Each of the computing units 340_1-340_N may generate a determining result by determining a shape and/or a center of the object 350, and/or by determining a relative distance, angle and moving direction between the object 350 and the image sensors. The control unit 330 receives the determining results R_1-R_N from the computing units 340_1-340_N to generate the control command S_command. In addition, the light source module 310 includes a plurality of light emitting units 310_1-310_N. Practically, the motion detecting system 300 can be regarded as a combination of a plurality of motion detecting sub-systems 360_1-360_N, where each of the motion detecting sub-systems comprises a light emitting unit, an image sensor and a computing unit. Because each of the motion detecting sub-systems is similar to the conventional gesture sensor, therefore, the motion detecting system 300 can be implemented by using the conventional gesture sensors and using the control unit 330 to integrate and analyze the determining results of the computer units of the gesture sensors to obtain the control command S_command.

Figure 4:
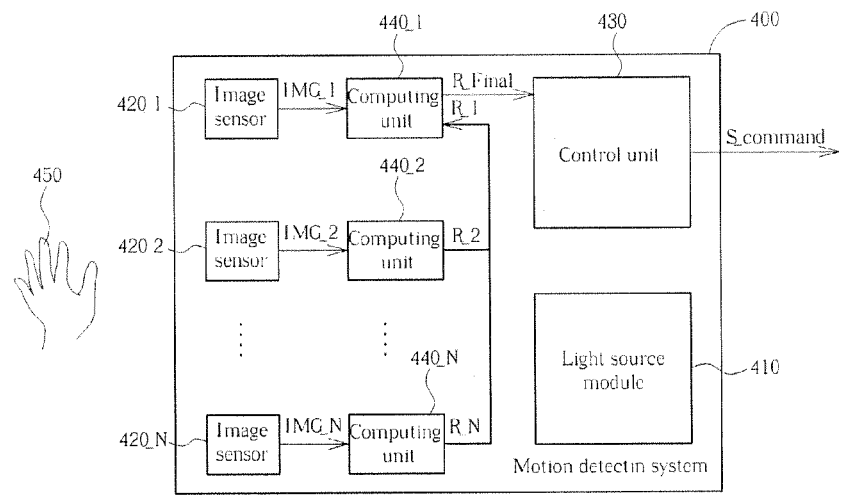
FIG. 4 is a diagram illustrating a motion detecting system according to a fourth embodiment of the present invention.

In another embodiment, the motion detecting system may include a plurality of computing units, but one of the computing units is used as a master. That is, the determining results generated from the other computing units are transmitted to the master first, and after the master analyzes the relationship between the data, the computing unit serving as the master transmits an integrated determining result to the control unit. The detail of the above-mentioned embodiment is shown in FIG. 4. The motion detecting system 400 comprises a plurality of computing units 440_1-440_N, where the computing units 440_1-440_N are coupled to the image sensors 420_1-420_N, and the computing units 440_1-440_N respectively receive the image sensing results IMG_1-IMG_N generated from the image sensors 420_1-420_N. Each of the computing units 440_1-440_N may generate a determining result by determining a shape and/or a center of the object 450, and/or by determining a relative distance, angle and moving direction between the object 350 and the image sensors. In addition, the computing unit 440_1 serving as the master receives the determining results R_2-R_N from the computing units 440_2-440_N, and the computing unit 440_1 generates an integrated determining result R_Final according to the determining results R_1-R_N, and transmits the integrated determining result R_Final to the control unit 430 to make the control unit 430 generate a corresponding control command S_command.

In addition, in the above embodiment, the light source module may comprise a plurality of light emitting units, and the control unit can control these light emitting units to illuminate the object at different times, respectively, and the image sensors sense the object at different times, respectively, to generate the image sensing results IMG_1-IMG_N.

Because the image sensor has a limited sensing range, to satisfy the demands of various applications, the image sensors of the motion detecting system of the preset invention have several possible positioning methods described as follows.

Figure 5A:
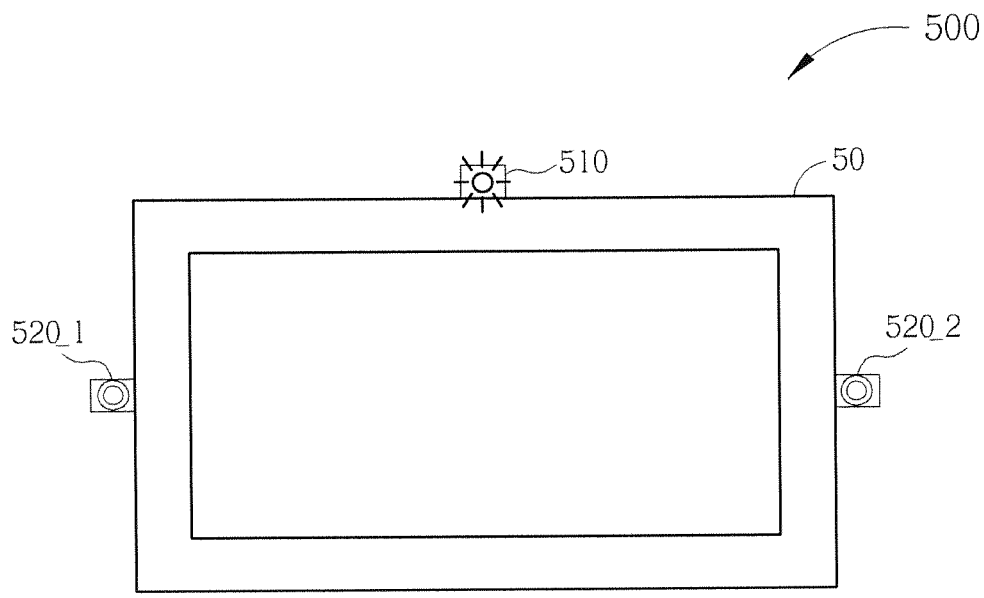
FIG. 5A-FIG. 13B are diagrams showing the positions of the motion detecting systems according to embodiments of the present invention.
Figure 5B:
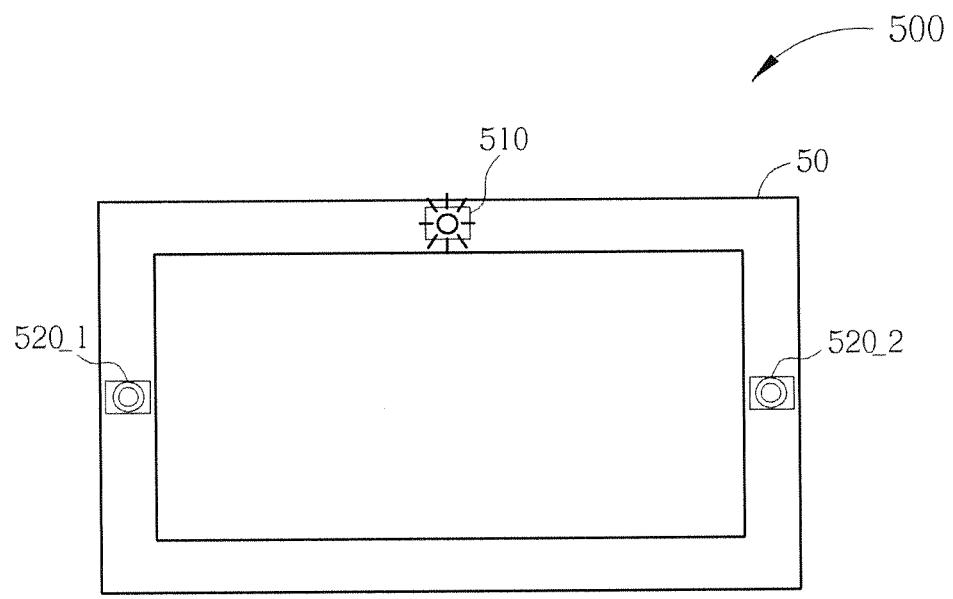

FIG. 5A and FIG. 5B are diagrams showing the positions of the motion detecting systems according to another embodiment of the present invention. As shown in FIG. 5A and FIG. 5B, the motion detecting system 500 comprises a light source module 510, image sensors 520_1-520_2 and a control unit (not shown). The image sensor 520_1 is positioned on a left side of a display device 50, and the image sensor 520_2 is positioned on a right left side of the display device 50, therefore, the horizontal sensing range of the motion detecting system 500 can be effectively increased. The difference between the embodiments shown in FIG. 5A and FIG. 5B is that: the light source module 510 and the image sensors 520_1-520_2 shown in FIG. 5B are positioned inside a housing of the display device 50, and the light source module 510 and the image sensors 520_1-520_2 shown in FIG. 5A are positioned outside the display device 50 (may be connected together or not).

Figure 6A:
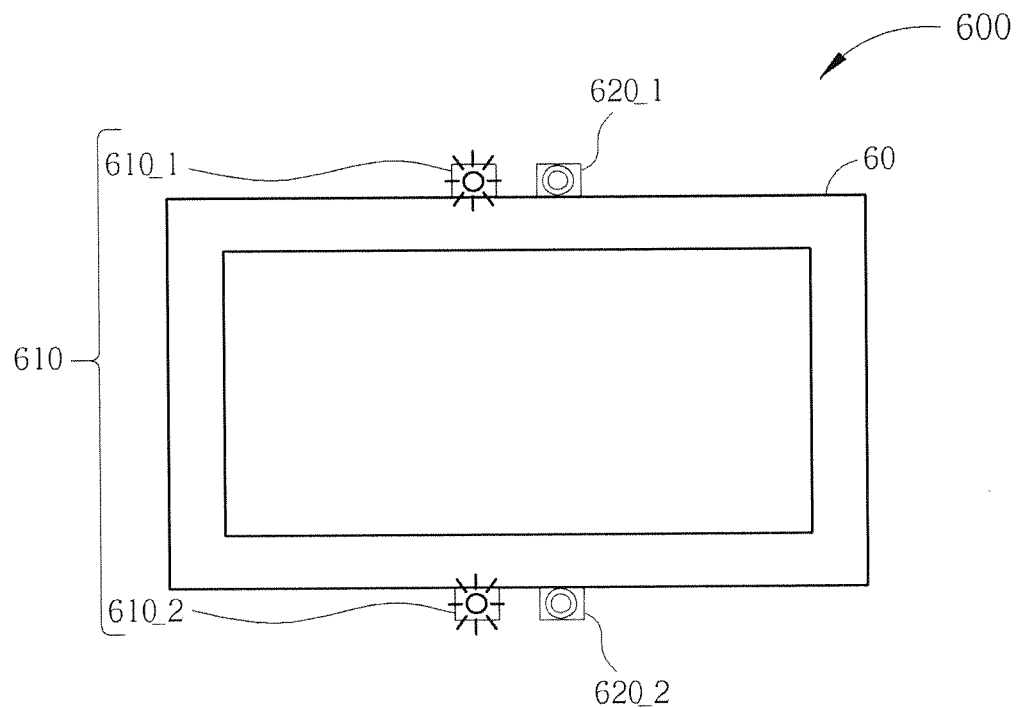
Figure 6B:
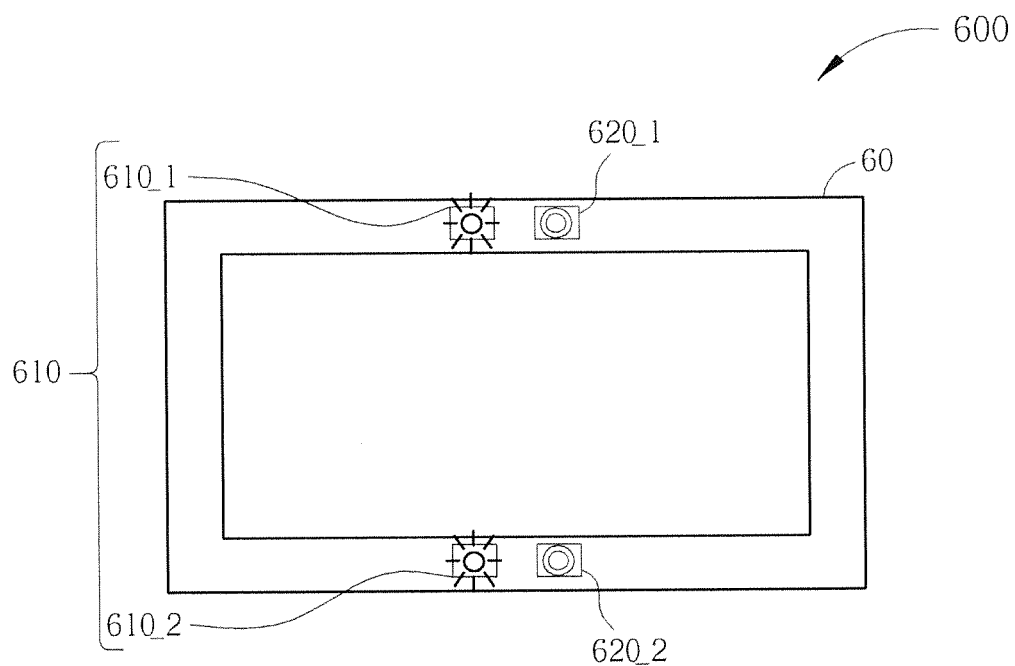

FIG. 6A and FIG. 6B are diagrams showing the positions of the motion detecting systems according to another embodiment of the present invention. As shown in FIG. 6A and FIG. 6B, the motion detecting system 600 comprises a light source module 610, image sensors 620_1-620_2 and a control unit (not shown). The light source module 610 comprises light emitting units 610_1 and 610_2. The light emitting unit 610_1 and the image sensor 620_1 are positioned on an up side of a display device 60, and the light emitting unit 610_2 and the image sensor 6202 are positioned on a down side of the display device 60, therefore, the vertical sensing range of the motion detecting system 600 can be effectively increased. The difference between the embodiments shown in FIG. 6A and FIG. 6B is that: the light emitting units 610_1-610_2 and the image sensors 620_1-620_2 shown in FIG. 6B are positioned inside a housing of the display device 60, and the light emitting units 610_1-610_2 and the image sensors 620_1-620_2 shown in FIG. 6A are positioned outside the display device 60 (may be connected together or not).

Figure 7A:
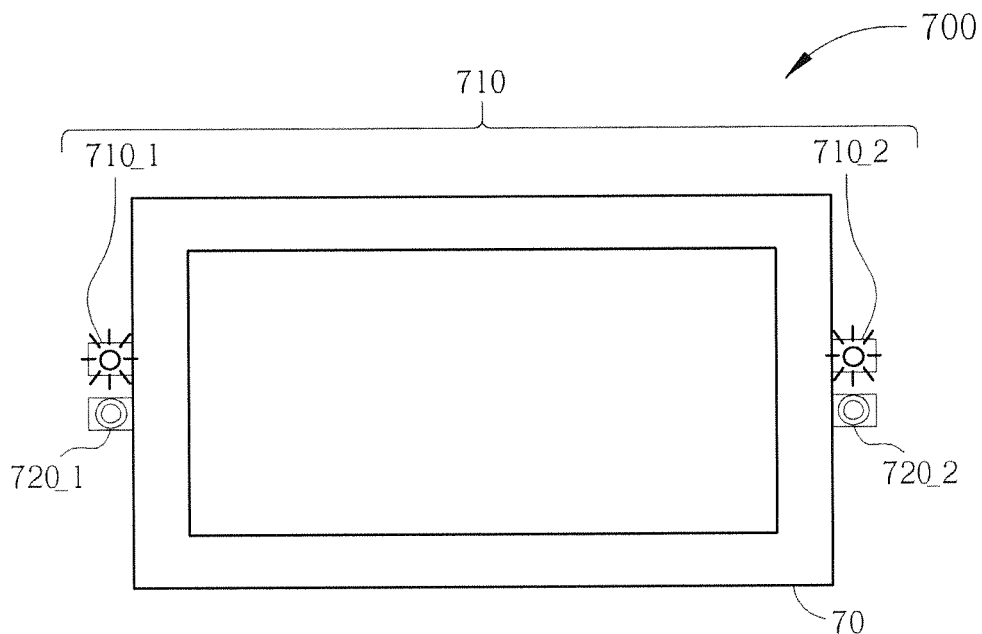
Figure 7B:
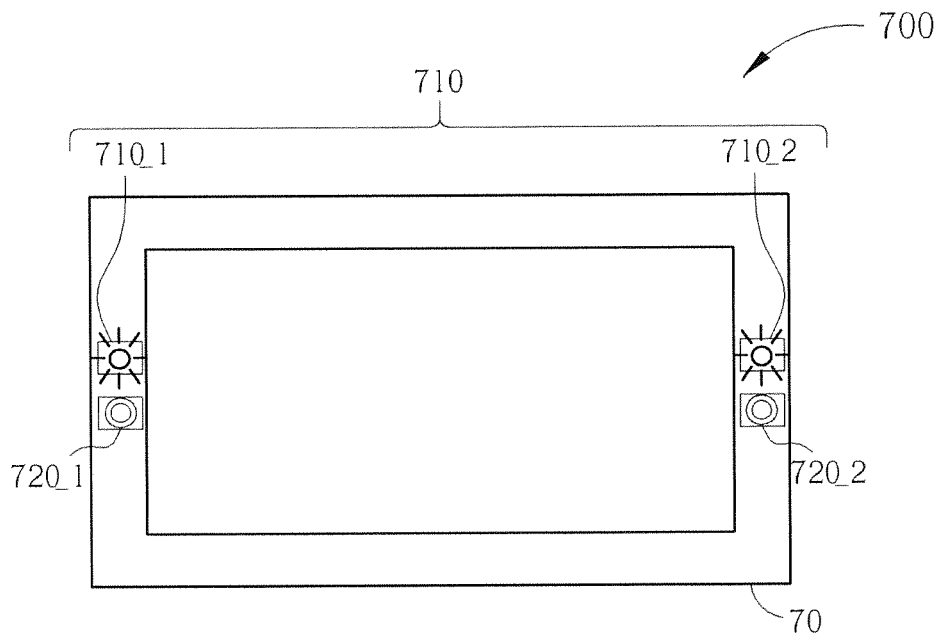

FIG. 7A and FIG. 7B are diagrams showing the positions of the motion detecting systems according to another embodiment of the present invention. As shown in FIG. 7A and FIG. 7B, the motion detecting system 700 comprises a light source module 710, image sensors 720_1-7202 and a control unit (not shown). The light source module 710 comprises light emitting units 710_1 and 710_2. The light emitting unit 710_1 and the image sensor 720_1 are positioned on a left side of a display device 70, and the light emitting unit 710_2 and the image sensor 720_2 are positioned on a right side of the display device 70, therefore, the horizontal sensing range of the motion detecting system 700 can be effectively increased. Moreover, because the light emitting units 710_1 and 710_2 are positioned on different sides, the lighting range can be increased to improve the sensitivity of the motion detecting system 700. The difference between the embodiments shown in FIG. 7A and FIG. 7B is that: the light emitting units 710_1-710_2 and the image sensors 720_1-720_2 shown in FIG. 7B are positioned inside a housing of the display device 70, and the light emitting units 710_1-710_2 and the image sensors 720_1-720_2 shown in FIG. 7A are positioned outside the display device 70 (may be connected together or not).

Figure 8A:
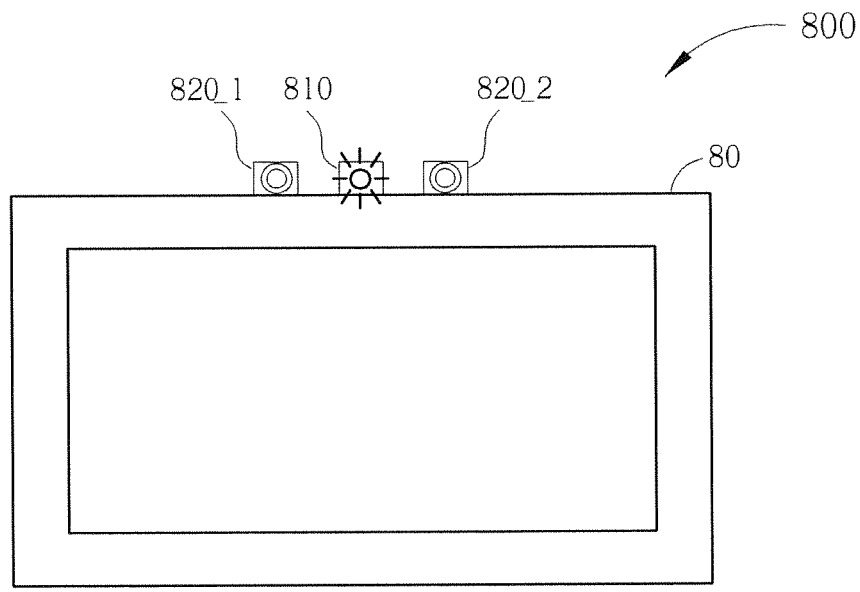
Figure 8B:
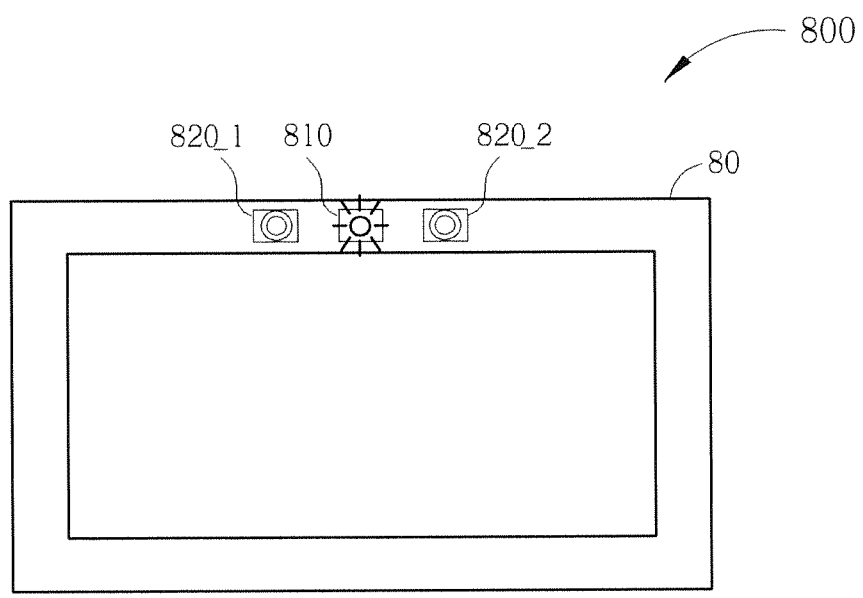

FIG. 8A and FIG. 8B are diagrams showing the positions of the motion detecting systems according to another embodiment of the present invention. As shown in FIG. 8A and FIG. 8B, the motion detecting system 800 comprises a light source module 810, image sensors 820_1-820_2 and a control unit (not shown). The light source module 810 and the image sensors 820_1-820_2 are positioned on the same side of a display device 80, and the image sensors 820_1-820_2 are positioned on two different sides of the light source module 810. Because the distance between the image sensors 820_1 and 820_2 is shorter, the image sensors 820_1 and 820_2 have an overlapping sensing range. If the image sensors 820_1 and 8202 are simultaneously used to sense an object, three-dimension position information can be obtained. The difference between the embodiments shown in FIG. 8A and FIG. 8B is that: the light source module 810 and the image sensors 820_1-820_2 shown in FIG. 8B are positioned inside a housing of the display device 80, and the light source module 810 and the image sensors 820_1-820_2 shown in FIG. 8A are positioned outside the display device 80 (may be connected together or not).

Figure 9A:
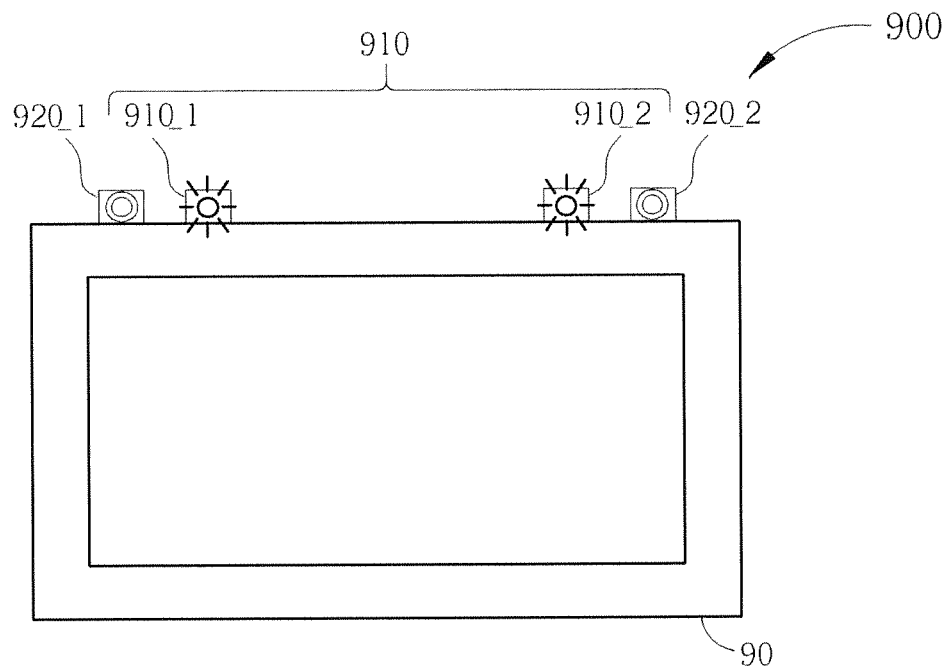
Figure 9B:
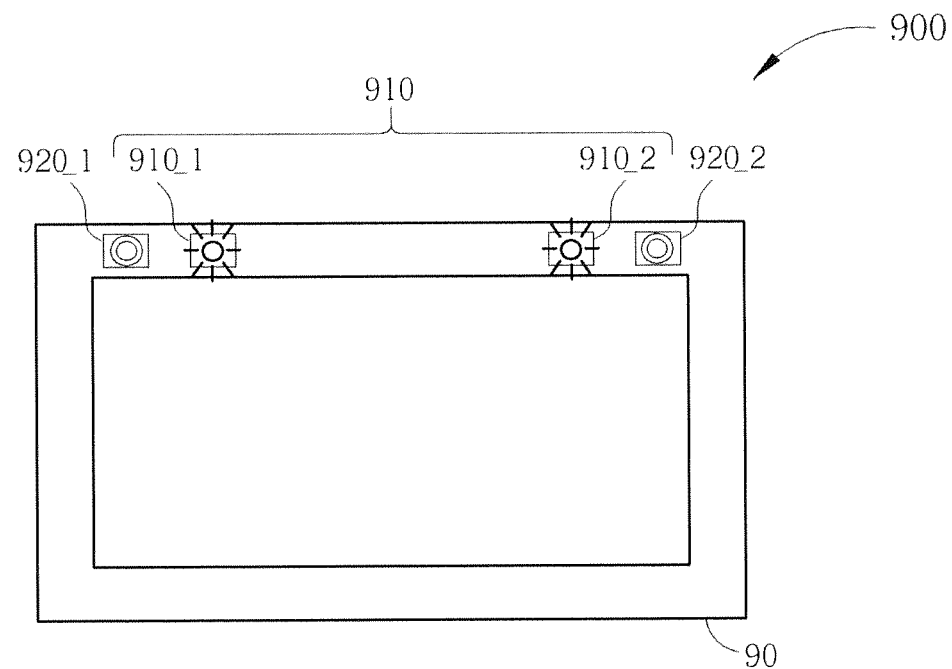

FIG. 9A and FIG. 9B are diagrams showing the positions of the motion detecting systems according to another embodiment of the present invention. As shown in FIG. 9A and FIG. 9B, the motion detecting system 900 comprises a light source module 910, image sensors 920_1-920_2 and a control unit (not shown). The light source module 910 comprises light emitting units 910_1-910_2. The light emitting units 910_1-910_2 and the image sensors 920_1-920_2 are positioned on the same side of a display device 90, the light source 910_1 and the image sensor 920_1 are positioned a relative left side of the display device 90, and the light source 910_2 and the image sensor 920_2 are positioned a relative right side of the display device 90. Because of the positions of the image sensors 920_1-920_2, three-dimension position information of an object may be obtained. In addition, because the motion detecting system 900 has more light emitting units, the sensitivity of the motion detecting system 900 is better. The difference between the embodiments shown in FIG. 9A and FIG. 9B is that: the light emitting units 910_1-910_2 and the image sensors 920_1-920_2 shown in FIG. 9B are positioned inside a housing of the display device 90, and the light emitting units 910_1-910_2 and the image sensors 920_1-920_2 shown in FIG. 9A are positioned outside the display device 90 (may be connected together or not).

Figure 10A:
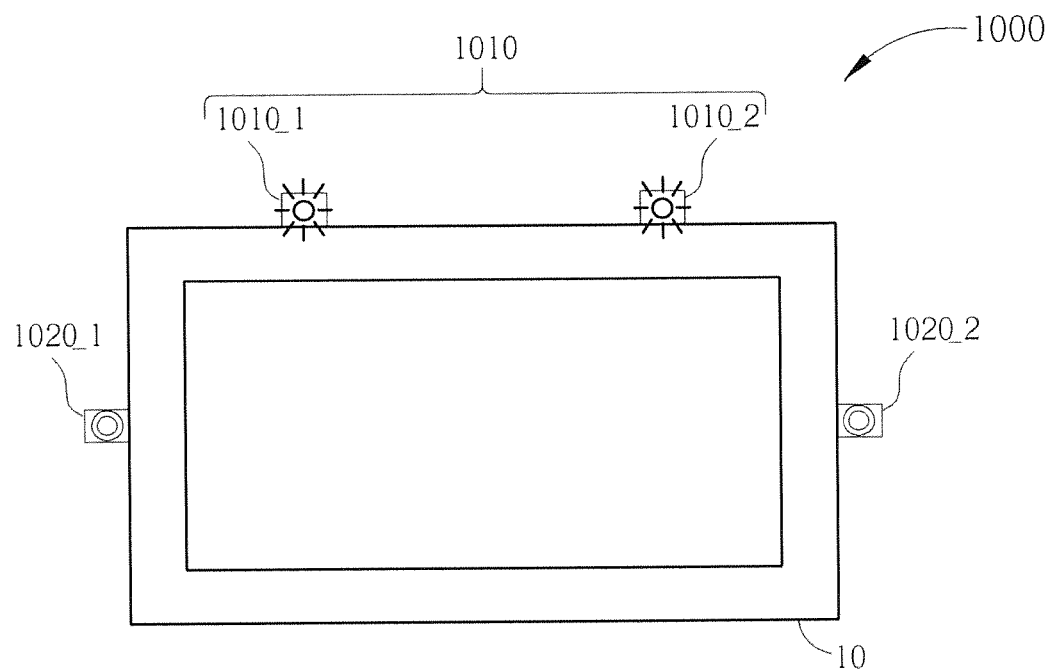
Figure 10B:
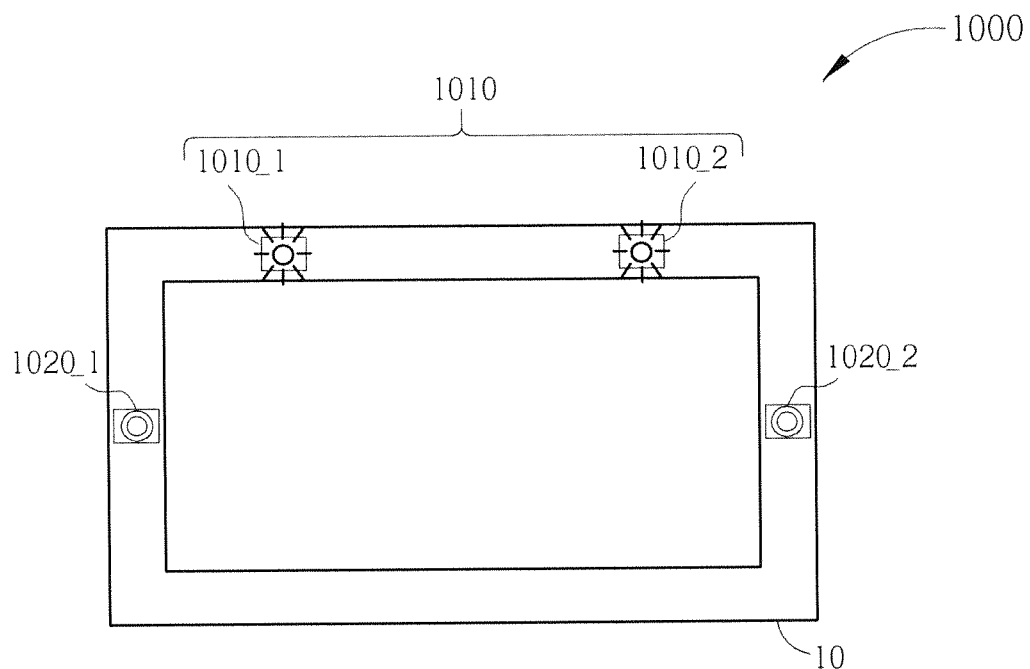

FIG. 10A and FIG. 10B are diagrams showing the positions of the motion detecting systems according to another embodiment of the present invention. As shown in FIG. 10A and FIG. 10B, the motion detecting system 1000 comprises a light source module 1010, image sensors 1020_1-1020_2 and a control unit (not shown). The light source module 1010 comprises light emitting units 1010_1-1010_2. The light emitting units 910_1-910_2 are positioned on the same side of a display device 10, and the image sensors 1020_1-1020_2 are positioned on the other two sides of the display device 10. The motion detecting system 1000 has a wider horizontal sensing range and a better sensitivity. The difference between the embodiments shown in FIG. 10A and FIG. 10B is that: the light emitting units 1010_1-1010_2 and the image sensors 1020_1-1020_2 shown in FIG. 10B are positioned inside a housing of the display device 10, and the light emitting units 1010_1-1010_2 and the image sensors 1020_1-1020_2 shown in FIG. 10A are positioned outside the display device 10 (may be connected together or not).

Figure 11A:
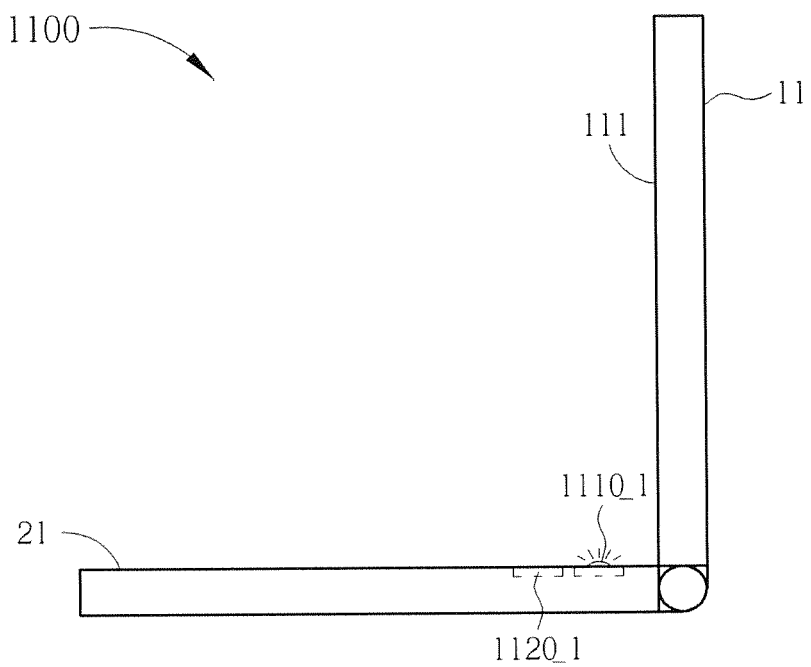
Figure 11B:
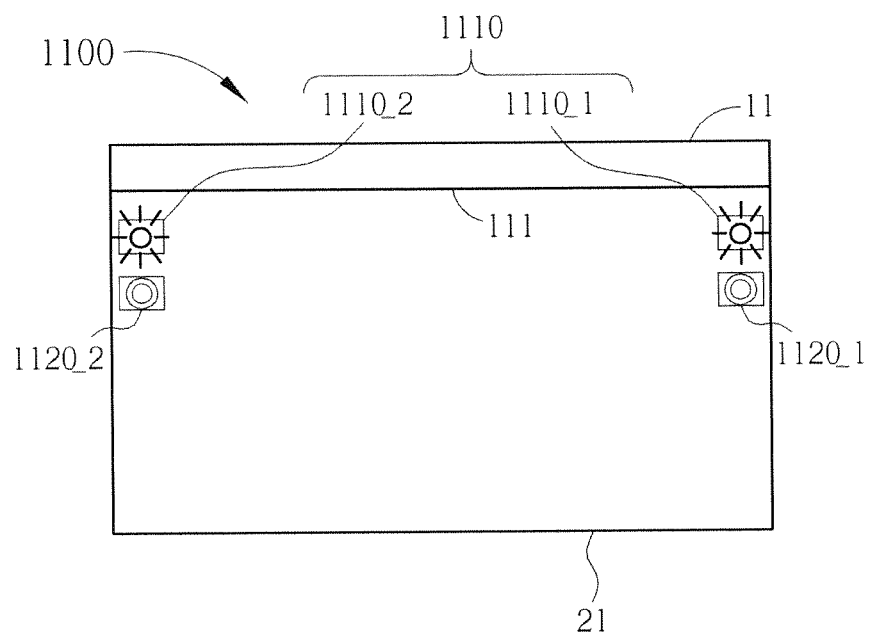
Figure 11C:
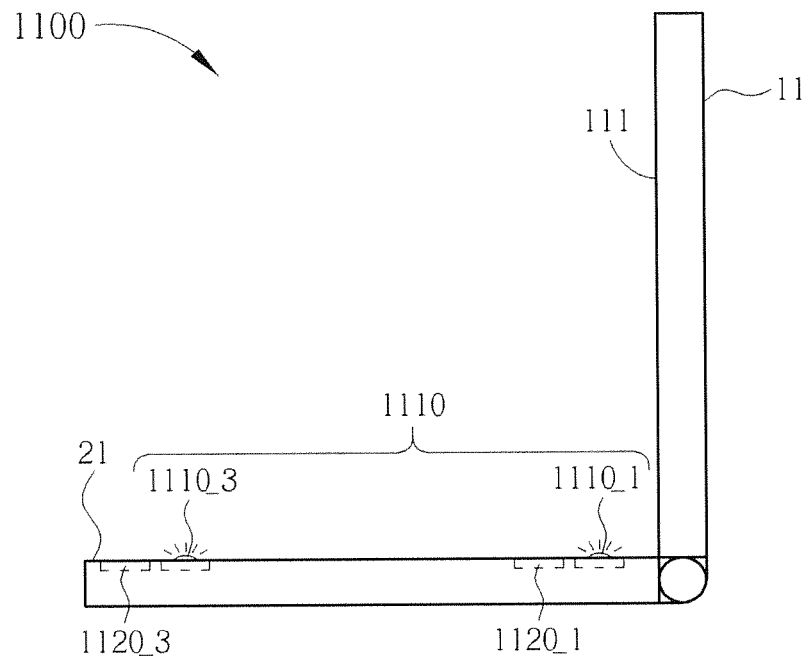
Figure 11D:
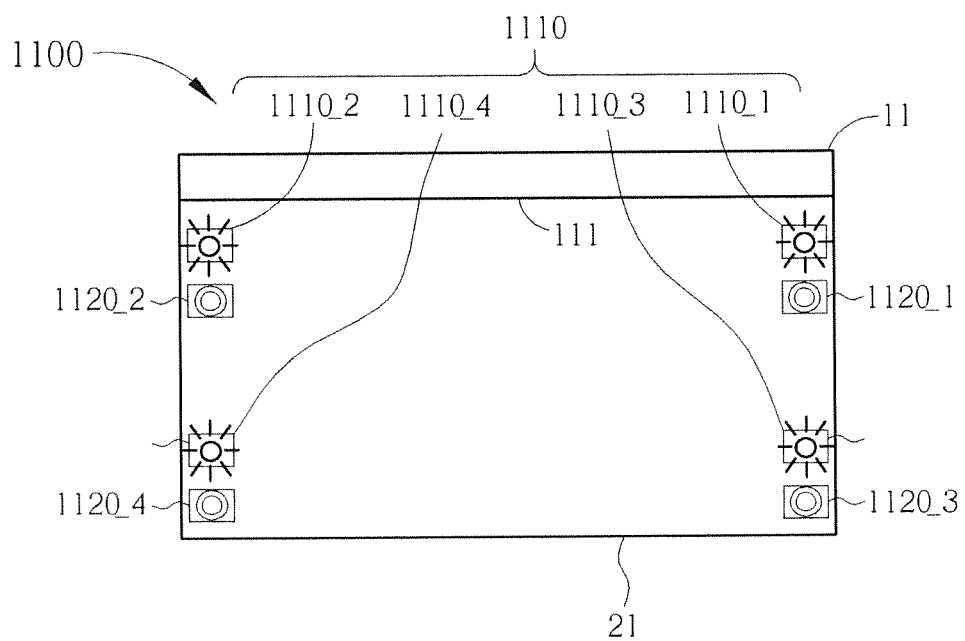

FIGS. 11A-11D are diagrams showing the positions of the motion detecting systems according to another embodiment of the present invention. Please refer to FIG. 11A and FIG. 11B first, where FIG. 11A is a side view of the embodiment, and FIG. 11B is a vertical view of the embodiment. The motion detecting system 1100 comprises a light source module 1110, image sensors 1120_1-1120_2 and a control unit (not shown). The light source module 1110 comprises light emitting units 1110_1-1110_2. The light emitting units 1110_1-1110_2 and the image sensors 1120_1-1120_2 are positioned on two sides of a front side of a display surface 111 of a display device 11. In this embodiment, because the light emitting units 1110_1-1110_2 and the image sensors 1120_1-1120_2 positioned in front of the display device 11, the sensed position information of the object is different from the previous embodiments. In addition, this embodiment also indicates that the motion detecting system of the present invention can be integrated into a notebook, where the display device 11 can be regarded as a built-in display of the notebook, and the bottom 21 can be regarded as a main body of the notebook. FIG. 11C and FIG. 11D are side view and vertical view of another embodiment. The difference between these two embodiments shown in FIG. 11A-11D is that: the embodiment shown in FIG. 11C and FIG. 11D has more image sensors 1120_3-1120_4 and more light emitting units 1110_3-1110_4, causing wider sensing range and better sensitivity.

Figure 12A:
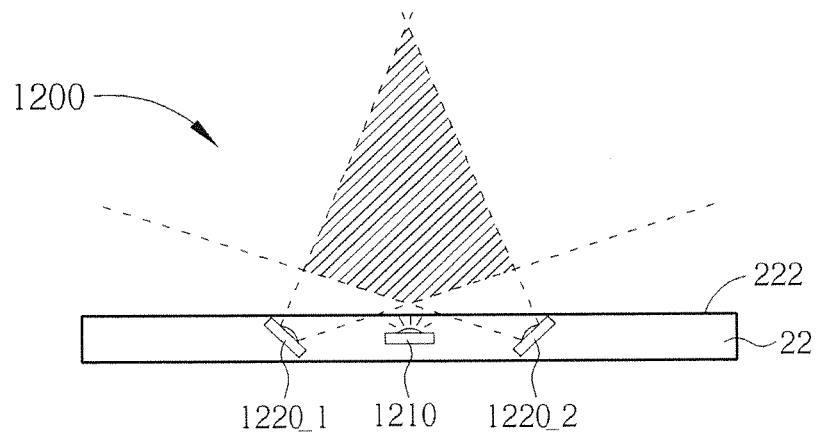
Figure 12B:
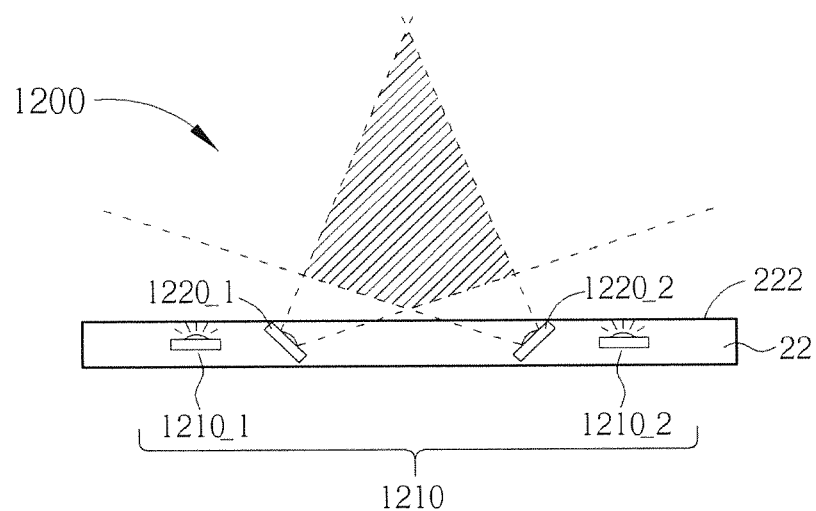

FIG. 12A and FIG. 12B are diagrams showing the positions of the motion detecting systems according to another embodiment of the present invention, where FIG. 12A and FIG. 12B is a vertical view of the motion detecting systems. The motion detecting system 1200 comprises a light source module 1210, image sensors 1220_1-1220_2 and a control unit (not shown). The image sensors 1220_1-1220_2 are positioned on a side of a display device 22 by using a non-parallel positioning method. That is, the positions of the image sensors 1220_1-1220_2 are not parallel to a display surface 222 of the display device 22. In this embodiment, because the image sensors 1220_1-1220_2 have a larger overlapping sensing range, more three-dimension information of an object can be obtained. The difference between these two embodiments shown in FIG. 12A and FIG. 12B is that: the embodiment shown in FIG. 12B has more light emitting units, and its sensitivity is better.

Figure 13A:
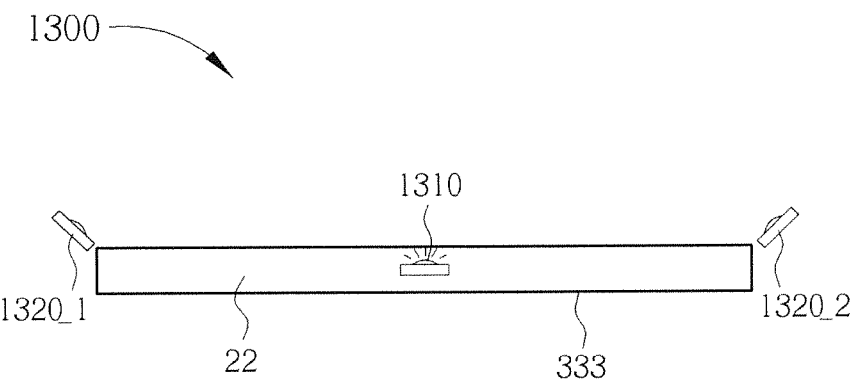
Figure 13B:
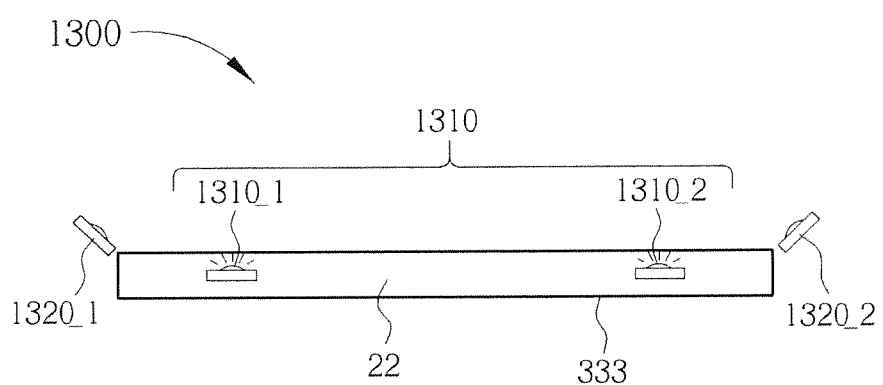

FIG. 13A and FIG. 13B are diagrams showing the positions of the motion detecting systems according to another embodiment of the present invention, where FIG. 13A and FIG. 13B is a vertical view of the motion detecting systems. The motion detecting system 1300 comprises a light source module 1310, image sensors 1320_1-1320_2 and a control unit (not shown). The image sensors 1320_1-1320_2 are positioned on a left side and a right side of a display device 33, respectively, by using a non-parallel positioning method (the image sensors 1320_1-1320_2 may be connected to an outside of the display device 33 or be built in a housing of the display device 33). That is, the positions of the image sensors 1320_1-1320_2 are not parallel to a display surface 333 of the display device 33. In this embodiment, because the image sensors 1320_1-1320_2 have a larger overlapping sensing range, more three-dimension information of an object can be obtained. The difference between these two embodiments shown in FIG. 13A and FIG. 13B is that: the embodiment shown in FIG. 13B has more light emitting units, and its sensitivity is better.

Referring to the above-mentioned embodiments, by using a non-parallel positioning method to arrange the positions of the image sensors on one side of the display device, the sensing ranges of the image sensors will have more overlapping region. However, in another embodiment, under this non-parallel positioning method, a position range of the image sensor can also be adjusted to make the sensing ranges of different image sensors are separate (i.e. not overlapped). Therefore, the image sensors may have an effective use, and the motion detecting system may have the largest sensing range. In addition, different image sensors may have different viewing angle and sensing range by using the lens design to satisfy the use's specific requirement about the sensing range. These alternative designs shall fall within the scope of the present invention.

Figure 14:
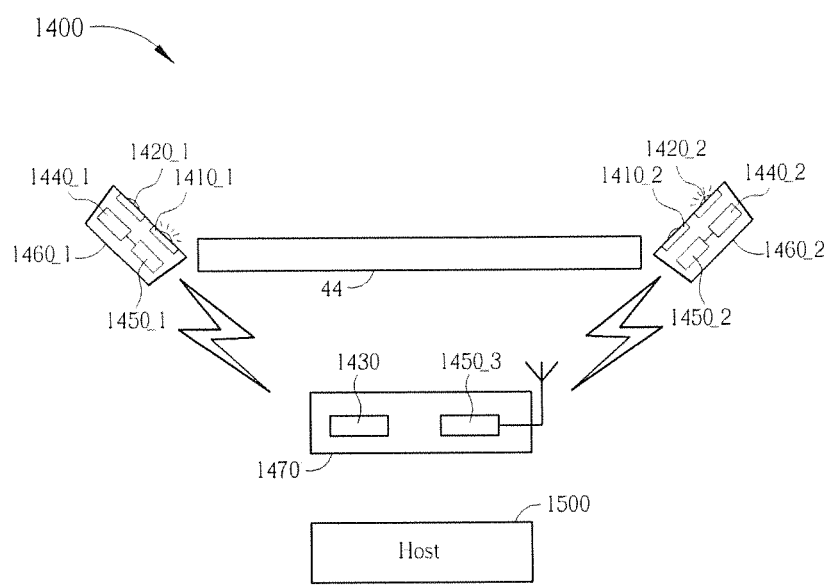
FIG. 14 is a diagram illustrating a motion detecting system having separate structure according to one embodiment of the present invention.

The motion detecting system of the present invention may also be implemented by using a separate structure. As shown in FIG. 14, the motion detecting system 1400 comprises motion detecting sub-systems 1460_1 and 1460_2, and a control sub-system 1470. The motion detecting sub-systems 1460_1 and 1460_2 comprise light emitting units 1410_1-1410_2, image sensors 1420_1-1420_2, computing units 1430_1-1430_2, wireless transmitting module 1450_1-1450_2, respectively, and the control sub-system 1470 comprises a control unit 1430 and a wireless transmitting module 1450_3. The motion detecting sub-systems 1460_1 and 1460_2 use their image sensors and computing units to generate determining results R_1 and R_2 by determining a shape and/or a center of the object, and/or by determining a relative distance, angle and moving direction between the object and the image sensors. Then, the determining results R_1 and R_2 are transmitted to the control sub-system 1470 via the wireless transmitting modules 1450_1-1450_2. The wireless transmitting module 1450_3 of the control sub-system 1470 transmits the received determining results R_1 and R_2 to the control unit 1430, and the control unit 1430 generates the control command S_command according to the determining results R_1 and R_2. Then, the control command S_command is transmitted to a host 1500 by using wire transmission or wireless transmission (via the wireless transmitting module 1450_3). In another embodiment of the present invention, the motion detecting sub-system 1460_1 may serve as a mater, and the motion detecting sub-system 1460_2 transmits its determining result R_2 to the motion detecting sub-system 1460_1 via the wireless transmitting module 1450_2. Then the computing unit 1440_1 generates an integrated determining result R_Final according to a sensing result of the image sensor 1420_1 and the determining result R_2, and the determining result R_2 is transmitted to the control sub-system 1470 via the wireless transmitting module 1450_1. The control unit 1430 generates the control command S_command according to the integrated determining result R_Final, and transmits the control command S_command to the host 1500 via wire transmission or wireless transmission. The host 1500 may start to execute an application according to the control command S_command, or the host 1500 may control the executed application according to the control command S_command, and the results of the application generated according to the control command S_command are shown on a display device 44. The above embodiment has the advantages such as the distance between different image sensors can be larger, not be limited by the length of the connecting lines, and wider sensing range.

Figure 15A:
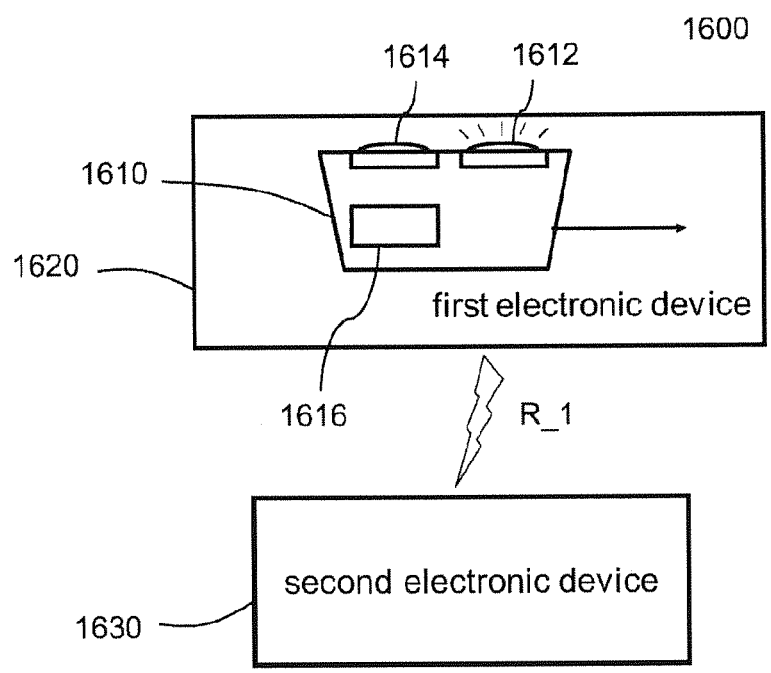
FIG. 15A-FIG. 15B are diagrams illustrating a motion detecting system according to an alternative embodiment of the present invention.

FIG. 15A is a diagram illustrating a motion detecting system according to an alternative embodiment of the present invention. Referring to FIG. 15A, the motion detecting system 1600 of this embodiment includes a first motion detecting sub-system 1610, a first electronic device 1620 and a second electronic device 1630. The first motion detecting sub-system 1610 is integrated in the first electronic device 1620. The first motion detecting sub-system 1610 includes a light emitting unit 1612, an image sensor 1614 and a computing unit 1616. The first motion detecting sub-system 1610 may generate a determining result R_1 that represents a relative distance, an angle or a moving direction between an object and the image sensor 1614 by using the image sensor 1614 and the computing unit 1616. For example, the first motion detecting sub-system 1610 may detect gesture motions of a user (e.g. leftward motion, rightward motion, forward motion, backward motion, upward motion, downward motion or specific gesture appearance) to accordingly generate a control command (e.g. the determining result R_1).

In this embodiment, the first electronic device 1620 may be a handheld electronic device or a portable electronic device, e.g. a cell phone, an electronic book, a tablet computer or other portable electronic devices without a display screen. More specifically, the determining result R_1 detected by the first motion detecting sub-system 1610 integrated on the first electronic device 1620 may be configured to control the operation mode (e.g. page flip, selection menu operation, software execution and so on) of the first electronic device 1620 as well as transmit the determining result R_1 to the second electronic device 1630 for controlling the second electronic device 1630, wherein the determining result R_1 may be transmitted to the second electronic device 1630 wirelessly. In another embodiment, the determining result R_1 may be transmitted to the second electronic device 1630 via a cable line. In this embodiment, the second) electronic device 1630 may be a digital TV or other electronic devices with a display screen.

In one embodiment, the above determining result R_1 may be firstly processed by the first electronic device 1620 and then transmitted to the second electronic device 1630 so as to control or operate the state of the second electronic device 1630, e.g. switching on-screen webpages, switching TV channels, controlling volume of the second electronic device 1630. That is, the above determining result R_1 may be coordinate information of the object and the first electronic device 1620 may process the determining result R_1 an as to generate the control command for controlling the second electronic device 1630.

Figure 15B:
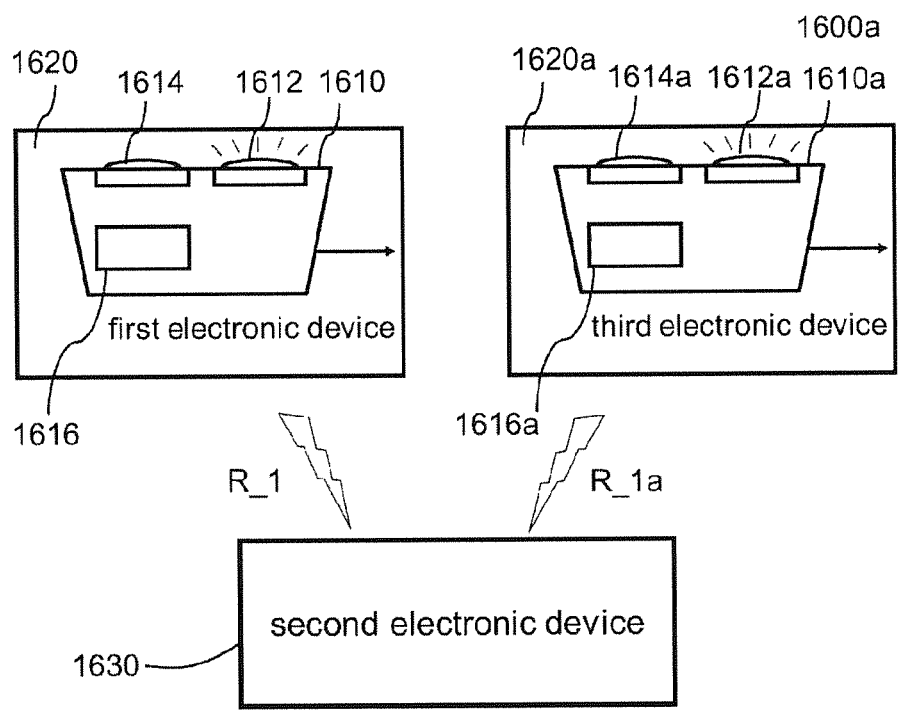

FIG. 15B is a diagram illustrating a motion detecting system according to an alternative embodiment of the present invention. Referring to FIGS. 15A and 15B, the motion detecting system 1600a of this embodiment has the same concept as the above motion detecting system 1600, and the difference therebetween is that the motion detecting system 1600a further includes at least one second motion detecting sub-system 1610a and at least one third electronic device 1620a employing the second motion detecting sub-system 1610a, wherein the second motion detecting sub-system 1610a integrated in the third electronic device 1620a includes a light emitting unit 1612a, an image sensor 1614a and a computing unit 1616a. Similarly, the second motion detecting sub-system 1610a may generate a determining result R_1a that represents a relative distance, an angle or a moving direction between an object and the image sensor 1614a by using the image sensor 1614a and the computing unit 1616a. For example, the second motion detecting sub-system 1610a may detect gesture motions of a user (e.g. leftward motion, rightward motion, forward motion, backward motion, upward motion, downward motion or specific gesture appearance) to accordingly generate a control command (e.g. the determining result R_1a).

More specifically, the motion detecting system 1600a may perform the detection or identification of the gesture or object by using the first electronic device 1620 integrated with the first motion detecting sub-system 1610 as well as perform the detection or identification of the gesture or object by using the third electronic device 1620a integrated with the second motion detecting sub-system 1610a; that is, the motion detecting system 1600a of this embodiment may be operated simultaneously by different users holding the first electronic device 1620 and the third electronic device 1620a respectively so as to be applied to multi-user control operation, e.g. used in games.

It is noted that the term "one embodiment" mentioned above represents a particular feature, structure, or characteristic described for the embodiment are included in at least one implementation of the present invention. Furthermore, the term "one embodiment" appears in different paragraphs represents a different embodiment. Therefore, although different structural features or methods are described for the different embodiments described above, but it should be noted that these different characteristics may be implemented on the same specific embodiment through appropriate modifications.

Briefly summarized, the motion detecting system of the present invention may increase the effective sensing range and sensitivity by using more image sensors and lighting units, and therefore the efficiency of the motion detecting system is enhanced. In addition, by using the above-mentioned positioning method of the embodiments, each of the image sensors may have its most effective use.

Figure 16A:
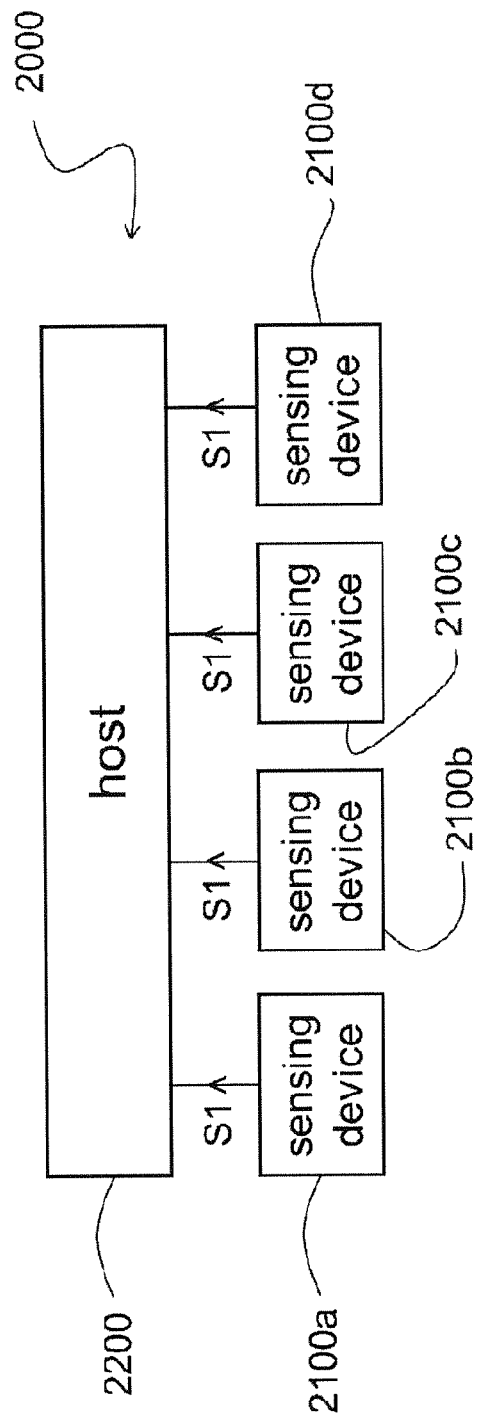
FIG. 16A is a schematic block diagram of an electronic device according to one embodiment of the present disclosure.

FIG. 16A is a schematic block diagram of an electronic device 2000 according to one embodiment of the present disclosure. Referring to FIG. 16A, the electronic device 2000 of this embodiment includes a plurality of sensing devices 2100a-2100d and a host 2200. More specifically speaking, the host 2200 is respectively coupled to each of the plurality of sensing devices 2100a-2100d. That is to say, the plurality of sensing devices 2100a-2100d is connected in parallel to the host 2200. It is appreciated that although four sensing devices 2100a-2100d are shown in FIG. 16A, the present disclosure is not limited thereto. The number of the sensing devices is determined according to different applications.

Figure 16B:
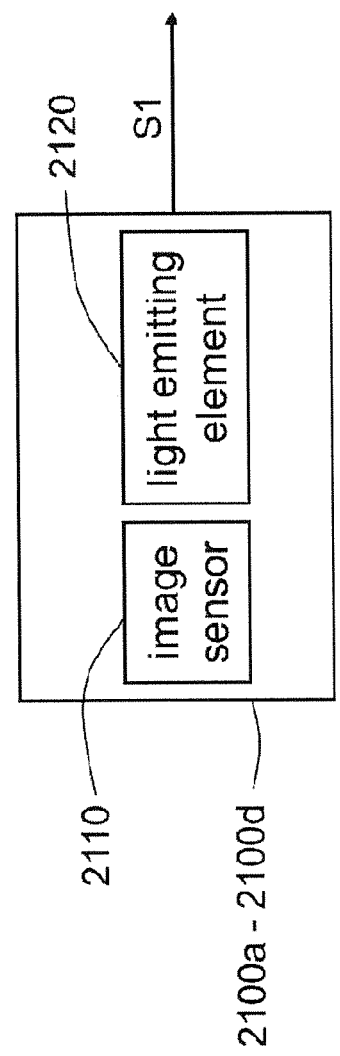
FIG. 16B is a schematic block diagram of a sensing device in the electronic device of FIG. 16A.

In this embodiment, the plurality of sensing devices 2100a-2100d is respectively configured to detect an object and output a detection signal containing object information of the object. In some embodiments, the sensing devices 2100a-2100d are, for example, gesture detection devices. Each of the sensing devices 2100a-2100d includes an image sensor 2110 and a light emitting element 2120, as shown in FIG. 16B, wherein the light emitting element 2120 is configured to emit a light beam, e.g. infrared light or invisible light, and the image sensor 2110 is configured to receive reflective light of the light beam reflected by the object (e.g. a user's hand) and output a detection signal S1 to the host 2200. After receiving the detection signal S1 from at least one of the plurality of sensing devices 2100a-2100d, the host 2200 identifies a movement state of the object (e.g. the user's gesture) according to the object information. In this embodiment, since the plurality of sensing devices 2100a-2100d is connected in parallel to the host 2200, the host 2200 may determine whether to activate or wake up all the sensing devices 2100a-2100d, or activate or wake up only one, two or three of the sensing devices 2100a-2100d and deactivate other temporarily unused sensing devices. In this way, the power consumption can be reduced. It should be mentioned that the described deactivating other temporarily unused sensing devices is not limited to shut down the sensing devices. In some embodiments, the temporarily unused sensing devices may enter (or remain in) a power saving mode. For example, in the power saving mode, at least one of a light emitting frequency of the light emitting element 2120 and a sampling frequency of the image sensor 2110 may be decreased so as to reduce the power consumption.

In one embodiment, the electronic device 2000 detects the object with one of the plurality of sensing devices 2100a-2100d at first. If a sensing event occurs, the remaining sensing devices are activated together for the detection. After all the sensing devices are activated, if the host 2200 identifies that it is not necessary to use all the sensing devices 2100a-2100d, the host 2200 may then detect the object with only apart of the sensing devices 2100a-2100d according to the identification thereof so as to reduce the power consumption. It is appreciated that in the electronic device 2000, the host 2200 controls the activation and deactivation of each of the sensing devices 2100a-2100d according to the received detection signal S1.

In one embodiment, the electronic device 2000 is a handheld electronic device (e.g. a smart phone or a tablet PC), and the sensing devices 2100a-2100d are gesture detection devices. In a first period, the electronic device 2000 detects an object only using one (e.g. the sensing device 2100a) of the sensing) devices 2100a-2100d. Meanwhile, the sensing devices other than the sensing device 2100a remain in the power saving mode. Then, when a predetermined gesture is identified according the detection signal S1 of the sensing device 2100a, the host 2200 determines to activate at least a part (e.g. all or a part) of the sensing devices 2100a-2100d in a second period so as to increase the accuracy of identifying a state of the object.

It should be mentioned that the sensing devices 2100a-2100d are not limited to gesture detection devices. In other embodiments, the plurality of sensing devices 2100a-2100d is one or a combination of the gesture detection device, proximity sensing device, pupil detection device and fingerprint detection device, and the above mentioned devices are only intended to illustrate. When the pupil detection device is in use, the sensing event indicates a predetermined pupil is detected. When the fingerprint detection device is in use, the sensing event indicates a predetermined fingerprint is detected. The operation of the gesture detection device, proximity sensing device, pupil detection device and fingerprint detection device is known to the art, and thus details thereof are not described herein.

In one embodiment, the electronic device 2000 is a control system of smart home, and the sensing devices 2100a-2100d are proximity sensing devices respectively disposed in different rooms. In a first period, the electronic device 2000 detects whether an object (e.g. a human) enters the room with each of the sensing devices 2100a-2100d. Then, the host 2200 determines to activate at least a part of the sensing devices 2100a-2100d to detect the object in a second period according to a state of the object corresponding to the first period. For example, the sensing devices 2100a and 2100b respectively detect a human entering the associated room in the first period, and the sensing devices 2100c and 2100d do not detect anyone entering the associated room. The host 2200 then determines to activate the sensing devices 2100c and 2100d but deactivate (e.g. shut down) the sensing devices 2100a and 2100b in the second period thereby reducing the power consumption. And then, the sensing devices 2100a-2100d are activated together periodically every a predetermined time interval for the detection so that both the power saving and real time detection can be achieved.

It should be mentioned that in the present disclosure the host 2200 determines an operating arrangement for the plurality of sensing devices 2100a-2100d (e.g. a number of the sensing devices to be activated/deactivated) in a next sampling period according to the received detection signal S1. The numbers mentioned in the above embodiments are only intended to illustrate, but not to limit the present disclosure.

In some embodiments, each of the sensing devices 2100a-2100d may further include a processing unit configured to identify the sensing event according to the image captured by the image sensor 2110, and the detection signal S1 contains information of the identifying result. In other embodiments, each of the sensing devices 2100a-2100d only outputs the image, which is served as the detection signal S1, captured by the image sensor 2110 and the host 2200 performs corresponding calculations, such as the gesture detection, proximity detection, pupil detection, fingerprint detection or the like.

FIG. 17A is a schematic block diagram of an electronic device 3000 according to one embodiment of the present disclosure. Referring to FIG. 17A, the electronic device 3000 of this embodiment includes a plurality of sensing devices 3100a-3100d and a host 3200. The plurality of sensing devices 3100a-3100d and the host 3200 are connected in series. More specifically speaking, the plurality of sensing devices 3100a-3100d is connected in series and the sensing devices 3100a-3100d connected in series include an initial sensing device (e.g. 3100a as shown in FIG. 17A) and a last sensing device (e.g. 3100d as shown in FIG. 17A). Meanwhile, the host 3200 is coupled to the last sensing device but not coupled to other sensing devices. That is to say, among the sensing devices 3100a-3100d connected in series, one terminal is coupled to the host 3200 and the other terminal is the initial sensing device.

In this embodiment, the sensing devices 3100a-3100d are respectively configured to output a trigger signal 62 when detecting a sensing event. The sensing devices 3100a-3100d are, for example, gesture detection devices. Each of the sensing devices 3100a-3100d may include an image sensor 3110, a light emitting element 3120 and a processing unit 3130, as shown in FIG. 17B, wherein the light emitting element 3120 may emit infrared light or visible light to avoid disturbing a user in operation. The image sensor 3110 may receive infrared light reflected by an object and output a detection signal S1 to the processing unit 3130. Meanwhile, the processing unit 3130 identifies whether the sensing event is detected according to the received detection signal S1. For example, when a predetermined gesture is detected as the sensing event, the trigger signal 82 is then outputted. Accordingly, the processing unit 3130 determines whether to output the trigger signal 62 to another sensing device or the host 3200 according to the detection signal S1.

It should be mentioned that when a sensing device sends the trigger signal S2 (e.g. the initial sensing device 3100a sends the trigger signal S2 to the sensing device 3100b in FIG. 17A), the trigger signal S2 is configured to activate or wake up the sensing device to detect a sensing event. When a host receives the trigger signal S2 (e.g. the host 3200 receiving the trigger signal S2 from the last sensing device 3100d in FIG. 17A), the trigger signal S2 is configured to wake up the host. Meanwhile, the host generates a command signal correspondingly or performs other controls. In one embodiment, the electronic device 3000 is a handheld electronic device (e.g. a smart phone or a tablet PC), and the command signal is configured to unlock the handheld electronic device. In one embodiment, the electronic device 3000 is a vehicular computer, and the command signal is configured to start a vehicle engine. It is appreciated that the command signal generated by the host 3200 according to the received trigger signal S2 is determined according to different applications.

In this embodiment, the initial sensing device (e.g. the sensing device 3100a of FIG. 17A) detects a sensing event in a first period. Meanwhile, the sensing devices other than the initial sensing device (e.g. the sensing devices) 3100b-3100d of FIG. 17A) and the host (e.g. the host 3200 of FIG. 17A) remain in a power saving mode. Accordingly, other sensing devices and the host 3200 which have not received the trigger signal 82 yet may remain in the power saving mode so as to reduce the power consumption, wherein the power saving mode is described above and thus details thereof are not described herein.

In addition, the sensing devices 3100a-3100d are not limited to the gesture detection devices. In other embodiments, the sensing devices 3100a-3100d are selected from a group consisting of a proximity sensing device, pupil detection device or fingerprint detection device. Meanwhile, when the sensing devices 3100a-3100d detect a sensing event, e.g. an approaching user, a predetermined pupil or a predetermined fingerprint, the trigger signal 32 is then outputted.

More specifically speaking, a sensor structure using sensing devices connected in series may be used in a multiple password application. In one embodiment, the electronic device is a tablet PC including a first sensing device (e.g. the sensing device 3100c of FIG. 17A), a second sensing device (e.g. the sensing device 3100d of FIG. 17A) and a host (e.g. the host 3200 of FIG. 17A), wherein the second sensing device is coupled to the first sensing device, the host is coupled to the second sensing device but not coupled to the first sensing device, and the first sensing device is a gesture detection device and the second sensing device is a fingerprint detection device.

Then, one embodiment of an operating method of the tablet PC is described hereinafter. When the tablet PC enters a power saving mode (or a standby state) in a first period, the second sensing device and the host remain in the power saving mode. Meanwhile, only the first sensing device keeps operation and detects whether a first event occurs. Then, when the first sensing device detects the first event (e.g. detecting a predetermined gesture) in a second period, the first sensing device outputs a first signal (e.g. the trigger signal S2) to trigger the second sensing device to detect whether a second event occurs. Then, when the second device detects the second event (e.g. detecting a predetermined fingerprint) in a third period, the second device outputs a second signal (e.g. the trigger signal S2) to the host. Then, the host may verify a user identity according to the second signal and correspondingly generate a command signal to, for example, unlock the tablet PC or turn on a screen thereof. The first sensing device and the second sensing device may enter the power saving mode when the host is activated.

In another embodiment, the electronic device is a vehicular computer including a first sensing device (e.g. the sensing device 3100c of FIG. 17A), a second sensing device (e.g. the sensing device 3100d of FIG. 17A), a third sensing device (e.g. the sensing device 3100a of FIG. 17A), a fourth sensing device (e.g. the sensing device 3100b of FIG. 17A) and a host (e.g. the host 3200 of FIG. 17A), wherein the first sensing device is, for example, a fingerprint detection device, the second sensing device is, for example, a pupil detection device, the third sensing device is, for example, a proximity sensing device, and the fourth sensing device is, for example, a gesture detection device; and, a first event, a second event, a third event and a fourth event to be detected corresponding to the first sensing device, the second sensing device, the third sensing device and the fourth sensing device are, for example, a predetermined fingerprint, a predetermined pupil, an approach ing user and a predetermined gesture, respectively. The operating method of the vehicular computer is similar to that of the above tablet PC, and thus details thereof are not described herein. In this embodiment, when an approaching user is detected by the third sensing device, the fourth sensing device can be activated by the third sensing device. When the predetermined gesture is detected by the fourth sensing device, the first sensing device can be activated by the fourth sensing device. When the predetermined fingerprint is detected by the first sensing device, the second sensing device can be activated by the first sensing device. And, when the predetermined pupil is detected by the second sensing device, the host then verifies that the user is a previously registered driver. That is to say, the third sensing device, the fourth sensing device, the first sensing device and the second sensing device are successively activated for multiple identity verification. In this way, the security of the electronic device can be significantly improved.

It is appreciated that the above security application is only intended to illustrate. A sensor structure using sensing devices connected in series has the effect of power saving. For example, before receiving the trigger signal S2 sent from the last sensing device (e.g. 3100d), the host 3200 may still remain in a standby state (or a power saving mode).

In the present disclosure, the processing unit is, for example, a digital signal processor (DSP), a central processing unit (CPU), a microcontroller (MCU) or the like. The calculation or operation of the processing unit is implemented by software, hardware, firmware or a combination thereof without particular limitations.

In the above embodiments, the host, the first sensing device, the second sensing device, the third sensing device and the fourth sensing device are coupled to one another in a wired or wireless manner according to different applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device comprising:
    a first sensing device configured to output a first signal when detecting a first event;
    a second sensing device coupled to the first sensing device, and the second sensing device configured to detect a second event when receiving the first signal and output a second signal when detecting the second event;
    a third sensing device configured to output a third signal when detecting a third event;
    a fourth sensing device coupled to both the third sensing device and the first sensing device, and the fourth sensing device configured to detect a fourth event when receiving the third signal and output a fourth signal to the first sensing device when detecting the fourth event to allow the first sensing device to detect the first event; and
    a host coupled to the second sensing device but not coupled to the first sensing device, and the host configured to receive the second signal and verify a user identity according to the second signal.

2. The electronic device as claimed in claim 1, wherein the second sensing device is configured to remain in a power saving mode before receiving the first signal.

3. The electronic device as claimed in claim 1, wherein the host is configured to remain in a power saving mode before receiving the second signal.

4. The electronic device as claimed in claim 1, wherein the first sensing device is a fingerprint detection device, the second sensing device is a pupil detection device, the third sensing device is a proximity sensing device and the fourth sensing device is a gesture detection device.

5. The electronic device as claimed in claim 1, wherein the host, the first sensing device, the second sensing device, the third sensing device and the fourth sensing device are coupled to one another in a wired or wireless manner.

6. The electronic device as claimed in claim 1, wherein the fourth sensing device is configured to remain in a power saving mode before receiving the third signal.

7. The electronic device as claimed in claim 1, wherein in a period during which the third sensing device is detecting a sensing event, the first, second and fourth sensing devices and the host remain in a power saving mode.

8. The electronic device as claimed in claim 1, wherein each of the first, second, third and fourth sensing devices comprises an image sensor an a light emitting element.

9. The electronic device as claimed in claim 8, wherein the light emitting element is configured to emit infrared light or visible light.

* * * * *